(12) United States Patent
Szczepanski

(10) Patent No.: US 11,255,280 B2
(45) Date of Patent: Feb. 22, 2022

(54) DUAL UHEGO CONTROL OF PARTICULATE FILTER REGENERATION

(71) Applicants: DENSO International America, Inc., Southfield, MI (US); DENSO CORPORATION, Aichi (JP)

(72) Inventor: Edward Szczepanski, Grosse Pointe Woods, MI (US)

(73) Assignees: DENSO INTERNATIONAL AMERICA, INC., Southfield, MI (US); DENSO CORPORATION, Aichi (JP)

( * ) Notice: Subject to any disclaimer, the term of this patent is extended or adjusted under 35 U.S.C. 154(b) by 108 days.

(21) Appl. No.: 16/741,019

(22) Filed: Jan. 13, 2020

(65) Prior Publication Data

US 2021/0215114 A1 Jul. 15, 2021

(51) Int. Cl.
*F02D 41/00* (2006.01)
*F02D 41/14* (2006.01)
(Continued)

(52) U.S. Cl.
CPC ......... *F02D 41/0087* (2013.01); *F01N 9/002* (2013.01); *F02D 41/029* (2013.01);
(Continued)

(58) Field of Classification Search
CPC .. F01N 9/002; F01N 2250/02; F01N 2430/02; F01N 2900/0412; F01N 2900/1402; F01N 2900/1404; F01N 2900/1406; F01N 2900/1606; F02D 41/0087; F02D 41/029; F02D 41/1445; F02D 41/1454; F02D 41/1467;
(Continued)

(56) References Cited

U.S. PATENT DOCUMENTS

| 7,157,919 B1 * | 1/2007 | Walton | F01N 9/002 324/641 |
| 10,371,028 B2 * | 8/2019 | Martin | F01N 3/031 |

(Continued)

OTHER PUBLICATIONS

"Oxygen sensor," Wikipedia. Archived Sep. 14, 2018. https://en.wikipedia.org/wiki/Oxygen_sensor. (Year: 2018).*

*Primary Examiner* — Hung Q Nguyen
*Assistant Examiner* — Mark L. Greene
(74) *Attorney, Agent, or Firm* — Burris Law, PLLC

(57) ABSTRACT

A system for particulate filter regeneration includes a pre-converter universal heated exhaust gas oxygen (UHEGO) sensor disposed upstream from a three-way catalytic (TWC) converter and a particulate filter (PF), and a post-converter UHEGO sensor disposed downstream from the TWC converter and upstream from the PF. An engine controller for an internal combustion engine (ICE) and in communication with the pre-converter UHEGO sensor and the post-converter UHEGO sensor is included. The engine controller is configured to determine an amount of particulate mass accumulated in the PF during operation of the ICE and deactivate at least one of a plurality of cylinders of the ICE such that a deactivated cylinder intake air (DCIA) pass-through volume flows through the at least one deactivated cylinder and into the TWC converter and the PF. The DCIA pass-through volume is a function of the determined amount of particulate mass accumulated in the PF.

16 Claims, 3 Drawing Sheets

(51) Int. Cl.
 *F01N 9/00* (2006.01)
 *F02D 41/02* (2006.01)
(52) U.S. Cl.
 CPC ..... *F02D 41/1445* (2013.01); *F02D 41/1454* (2013.01); *F02D 41/1467* (2013.01); *F02D 41/1475* (2013.01); *F01N 2250/02* (2013.01); *F01N 2430/02* (2013.01); *F01N 2900/0412* (2013.01); *F01N 2900/1402* (2013.01); *F01N 2900/1404* (2013.01); *F01N 2900/1406* (2013.01); *F01N 2900/1606* (2013.01); *F02D 2200/0812* (2013.01)
(58) Field of Classification Search
 CPC ......... F02D 41/1475; F02D 2200/0812; F02D 13/06; F02D 17/02; F02D 2041/0012
 See application file for complete search history.

(56) References Cited

U.S. PATENT DOCUMENTS

2016/0115887 A1* 4/2016 Tsunooka ................ F02D 17/04
 60/274
2018/0347485 A1* 12/2018 Dudar ................... F02D 41/008

\* cited by examiner

DUAL UHEGO CONTROL OF PARTICULATE FILTER REGENERATION

FIELD

The present disclosure relates to particulate filter regeneration.

BACKGROUND

The statements in this section merely provide background information related to the present disclosure and may not constitute prior art.

An internal combustion engine (ICE) typically includes an exhaust system to route or handle exhaust gas (i.e., combusted gases) expelled from one or more cylinders of the ICE. And the exhaust system can include an exhaust gas aftertreatment system with a particulate filter (PF) to trap particulate matter (e.g., carbon and carbon containing particles) in the exhaust gas. However, if the PF is not periodically cleaned or regenerated, accumulated particulate matter on or in the PF may cause an increase in exhaust system back pressure, thereby leading to decreased engine performance.

Regenerating the PF of the particulate matter includes increasing the exhaust gas temperature such that accumulated particulate matter (typically referred to as "soot" or "particulate mass") is oxidized and removed from the PF.

Issues related to PF regeneration and other issues related to exhaust systems with particulate filter's or discussed in the present disclosure.

SUMMARY

In one form, the present disclosure is directed to a system for particulate filter regeneration. The system includes a pre-converter universal heated exhaust gas oxygen (UHEGO) sensor disposed upstream from a three-way catalytic (TWC) converter and a particulate filter (PF) and a post-converter UHEGO sensor disposed downstream from the TWC converter and upstream from the PF. An engine controller for an internal combustion engine (ICE) is included and the engine controller in communication with the pre-converter UHEGO sensor and the post-converter UHEGO sensor. Also, the engine controller is configured to determine an amount of accumulated particulate mass in the PF during operation of the ICE and to deactivate at least one of a plurality of cylinders of the ICE such that a deactivated cylinder intake air (DCIA) pass-through volume flows through the at least one deactivated cylinder and into the TWC converter and the PF. In some variations the DCIA pass-through volume is a function of the determined amount of accumulated particulate mass in the PF.

In one form, the present disclosure is directed to a method for regeneration of a PF. The method includes deactivating at least one cylinder of ICE such that a DCIA pass-through volume flows through the at least one deactivated cylinder and mixes with combusted exhaust gas to form oxygen enriched exhaust gas that flows into an exhaust gas aftertreatment system with the PF such that accumulated particulate mass in the PF is oxidized. Oxygen content in the oxygen enriched exhaust gas flowing into the exhaust gas aftertreatment system is monitored with a pre-converter UHEGO sensor disposed upstream from a TWC converter a post-convert UHEGO sensor disposed downstream the TWC converter and upstream the PF.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
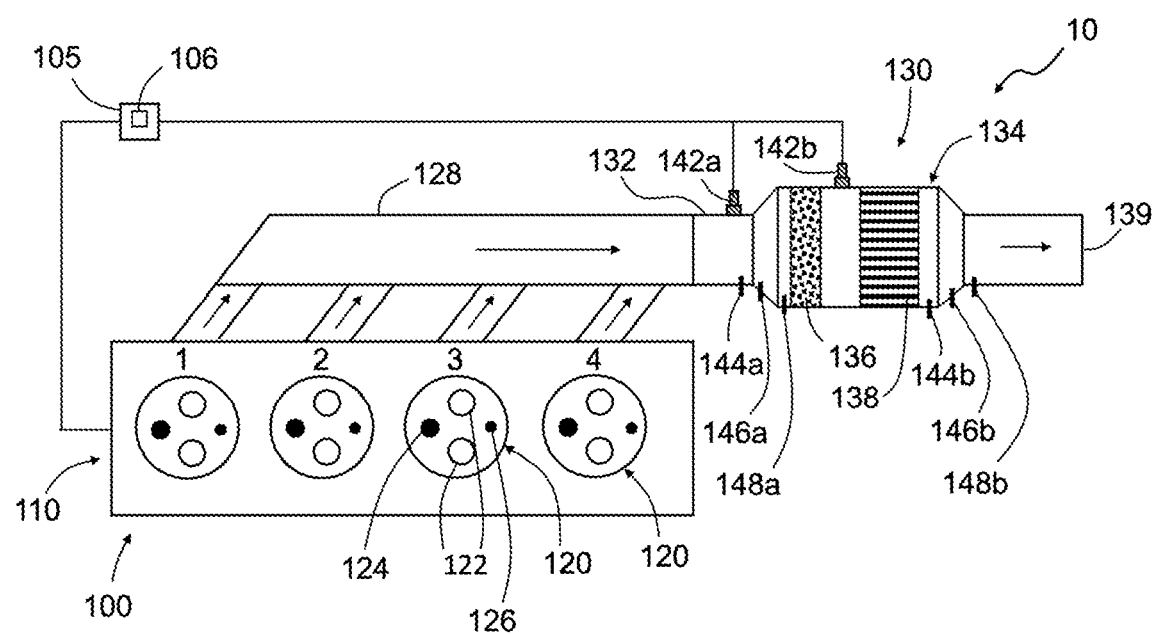
FIG. 1 shows a system for regeneration of a particulate filter according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A system for regeneration of a particulate filter (PF) in an exhaust aftertreatment system of an internal combustion engine (ICE) includes a pre-converter universal heated exhaust gas oxygen (UHEGO) sensor and a post-converter UHEGO sensor disposed in an exhaust pipe of the ICE and an engine controller in communication with the pre-converter and post-converter UHEGO sensors. The pre-converter UHEGO sensor is disposed upstream from a three-way catalytic (TWC) converter and the post-converter UHEGO sensor is disposed downstream from the TWC converter and upstream from the PF. The engine controller is configured to determine an amount of accumulated particulate mass in the PF during operation of the ICE and deactivates at least one cylinder of the ICE such that a deactivated cylinder intake air (DCIA) pass-through volume flows through the at least one deactivated cylinder, into the exhaust pipe, and through the TWC converter and the PF. Exhaust gas containing the DCIA pass-through volume is oxygen enriched and has an oxygen content such that the determined amount of particulate mass accumulated in the PF is oxidized and the PF is regenerated. The engine controller determines the DCIA pass-through volume as a function of the determined amount of accumulated particulate mass in the PF and a measured lambda value provided by the post-converter UHEGO sensor. The post-converter UHEGO sensor, i.e., the measured post-converter UHEGO sensor lambda, provides enhanced control of regeneration of the PF, thereby reducing the chances of damaging the PF during regeneration and/or emissions slip from the ICE.

Referring to FIG. 1, a system 10 for regeneration of a PF disposed in an exhaust system 130 of an ICE 100 is shown. The ICE 100 includes an engine controller 105 and a cylinder bank 110 including cylinders 120. Each cylinder 120 includes at least two valves 122 (e.g., an intake valve and an exhaust valve), a fuel injector 124, and a spark initiator 126 (e.g., a spark plug). A manifold 128 is in fluid communication with the cylinder bank 110.

The exhaust system 130 includes an exhaust pipe 132 and an exhaust aftertreatment system 134 with various components to filter exhaust gas flowing therethrough. For example the exhaust aftertreatment system 134 includes a three-way catalytic (TWC) converter 136 and a PF 138 disposed downstream from the TWC converter 136.

During operation of the ICE 100, the engine controller 105 directs fuel via the fuel injectors 124 and air via the valves 122 (i.e., intake valves) into each of the cylinders 120. The engine controller 105 also directs firing of each of the spark initiators 126 such that the fuel plus air mixture in each cylinder 120 is combusted and expelled from the cylinders 120 via the valves 122 (i.e., exhaust valves) as exhaust gas (not labeled). The exhaust gas expelled from the cylinders 120 flows through the manifold 128, the exhaust pipe 132, the TWC converter 136, the PF 138 and exits the exhaust system 130 at outlet 139. As the exhaust gas flows through the exhaust system 130, the TWC converter 136 provides reduction of nitrogen oxides (NOx) to nitrogen ($N_2$), oxidation of carbon monoxide (CO) to carbon dioxide ($CO_2$), and oxidation of unburnt hydrocarbons (HC) into $CO_2$ and water ($H_2O$).

The PF 138 provides particulate emissions control of the exhaust gas from the ICE 100. Specifically, the exhaust gas flowing from the TWC converter 136 includes small particulates (also referred to herein as "particulate mass") of unburnt HC and the PF 138 traps and holds the particulate mass to prevent its emission into the atmosphere.

Accumulation of the particulate mass in the PF 138 increases backpressure and/or temperature in the exhaust system 130 which can lead to a decrease in efficiency of the ICE 100. Accordingly, the particulate mass in the PF 138 is periodically oxidized during operation of the ICE 100 such that backpressure in the exhaust system 130 is reduced. Oxidation of the particulate mass in the PF 138 is known as and is referred to herein as "regeneration of the PF 138." It should be understood that the regeneration of the PF 138 can occur passively (i.e., during normal operation of and without additional measures or adjustments to the ICE 100). However, in some circumstances, for example during low temperature duty cycles of the ICE 100, active regeneration of the PF 138 is desired.

Still referring to FIG. 1, the system 10 includes a pre-converter universal heated exhaust gas oxygen (UHEGO) sensor 142a upstream from the TWC converter 136 and a post-converter UHEGO sensor 142b disposed downstream from the TWC converter 136 and upstream from the PF 138. In some variations of the present disclosure the pre-converter UHEGO sensor 142a and the post-converter UHEGO sensor 142b are disposed in the exhaust pipe 132.

The pre-converter UHEGO sensor 142a and the post-converter UHEGO sensor 142b are in communication with the engine controller 105 by way of, for example, a vehicle communication network (not shown) such as a controller area network (CAN), a local interconnect network (LIN), among others. It should be understood that a UHEGO sensor provides real time lambda ($\lambda$) values in contrast to simple "rich" and "lean" indicators as with heat exhaust gas oxygen (HEGO) sensors. That is, a UHEGO sensor provides an actual $\lambda$ value for an exhaust gas flowing past the UHEGO sensor. It should also be understood that as used herein the term "lambda" and the symbol "$\lambda$" refers to the air-fuel ratio in an exhaust gas where $\lambda$ equal to 1.0 ($\lambda=1.0$) refers to the stoichiometric air-fuel ratio, i.e., the exhaust gas contains the exact amount of fuel and air needed for stoichiometric combustion. Also, $\lambda<1.0$ refers to an air-fuel ratio for exhaust gas with more fuel than air needed for stoichiometric combustion (also referred to herein as "rich" or "rich mixture"), and $\lambda>1.0$ refers to an air-fuel ratio for exhaust gas with less fuel than air needed for stoichiometric combustion (also referred to herein as "lean" or "lean mixture").

In some variations of the present disclosure, the system 10 includes one or more sensors to monitor and provide feedback on the operation or condition(s) of the exhaust system 130. In the example shown in FIG. 1, the system 10 includes at least one PF sensor, illustratively shown as a pre-converter particulate sensor 144a (e.g., a radio frequency (RF) particulate sensor), a post-converter particulate sensor 144b, a pre-converter pressure sensor 146a, a post-converter pressure sensor 146b, a pre-converter temperature sensor 148a, and a post-converter temperature sensor 148b. It should be understood that the pre-converter and post-converter particulate sensors 144a, 144b monitor and estimate particulate mass accumulation in the PF 138, the pre-converter and post-converter pressure sensors 146a, 146b measure pressure upstream and downstream from the PF 138, respectively, and the pre-converter and post-converter temperature sensors 148a, 148b measure temperature upstream and downstream of the PF 138, respectively. It should also be understood that the engine controller 105 is configured to receive and use information from the sensors to calculate the amount of particulate mass accumulated in the PF 138 as described in greater detail below.

In at least one form of the present disclosure the engine controller 105 deactivates one or more of the cylinders 120, while retaining the ability to control the flow of air (including volume of air) into and out of the one or more cylinders 120, for a predetermined amount of time such that a deactivated cylinder intake air (DCIA) pass-through volume flows through the at least one deactivated cylinder 120, into the exhaust pipe 132, and through the TWC converter 136 and the PF 138. That is, the engine controller 105 deactivates one or more cylinders 120 by directing the valves 122 (i.e., the intake valve and the exhaust valve) of each deactivated cylinder 120 to remain open for a first predetermined amount of time, the fuel injector 124 of each deactivated cylinder to remain closed for a second predetermined amount of time, and the spark initiator 126 of each deactivated cylinder 120 not to provide a spark for one or more combustion cycles. In some variations the first predetermined amount of time is equal to the second predetermined amount of time, while in other variations the first predetermined amount of time is not equal to the second predetermined amount of time. However, in most if not all variations a predetermined amount of air, and not fuel, flows into and out of each deactivated cylinder 120 thereby allowing a rate of oxidation of the particulate mass in the PF 138 to be set and controlled such that thermal run away and possible damage to the PF 138 is prevented.

It should be understood that the DCIA pass-through volume enriches the exhaust gas flowing into the exhaust pipe 132 with oxygen and does not enrich the exhaust gas with lean combusted exhaust gas containing NOx. That is, deactivating one or more of the cylinders 120 such that the DCIA pass-through volume flows into the exhaust gas reduces the amount of NOx, generated in the one or more cylinders 120 during combustion and needing to be treated by the TWC converter 136, while providing oxygen for regeneration of the PF 138. Also, the active cylinders 120 can maintain a target lambda (e.g., lambda=1.0) during PF regeneration while the one or more deactivated cylinders 120 provide oxygen, without an increase in NOx, to the PF 138.

Figure 2A:
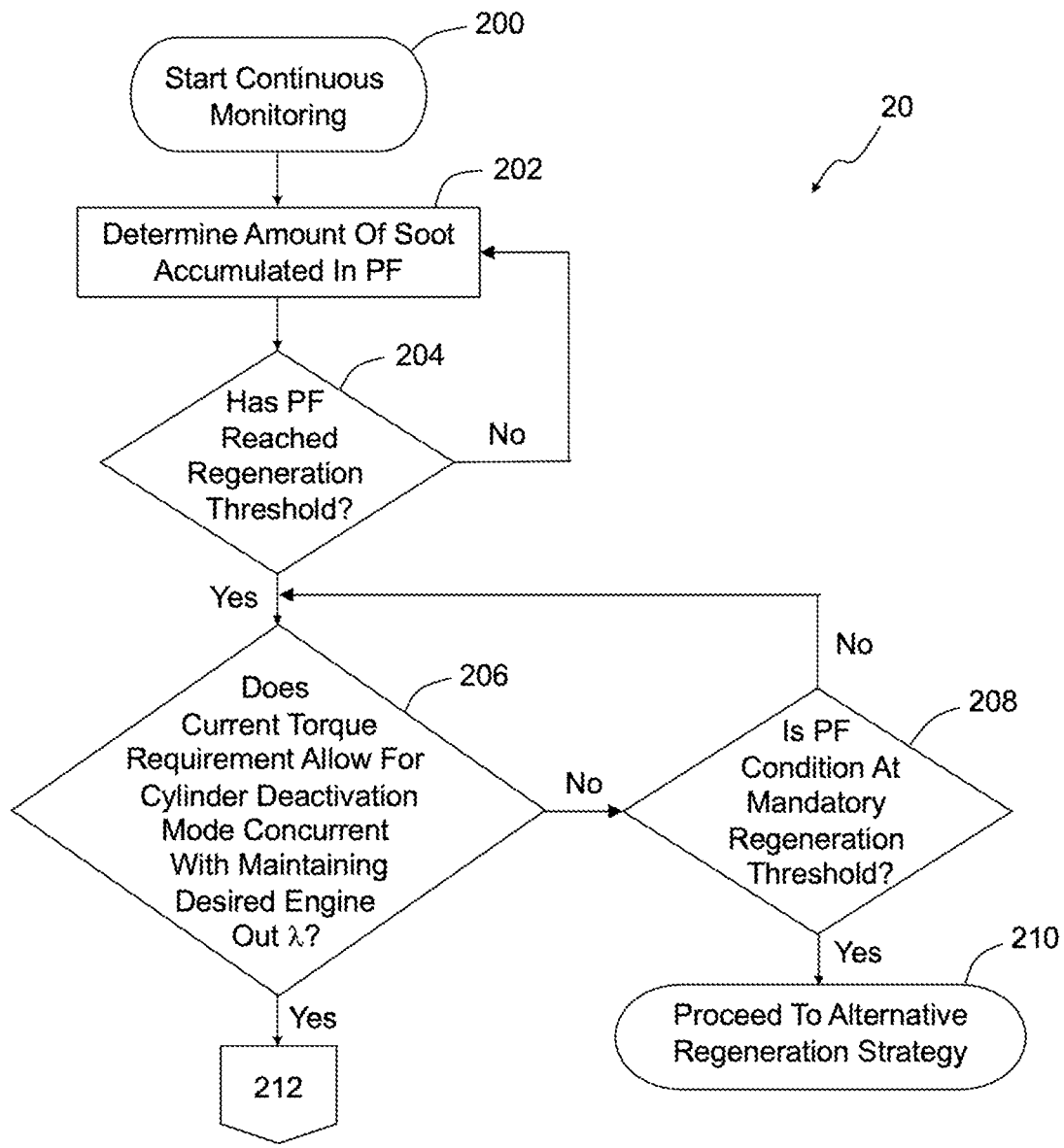
FIG. 2A is a flow chart for a method regeneration of particulate filter according to the teachings of the present disclosure.
Figure 2B:
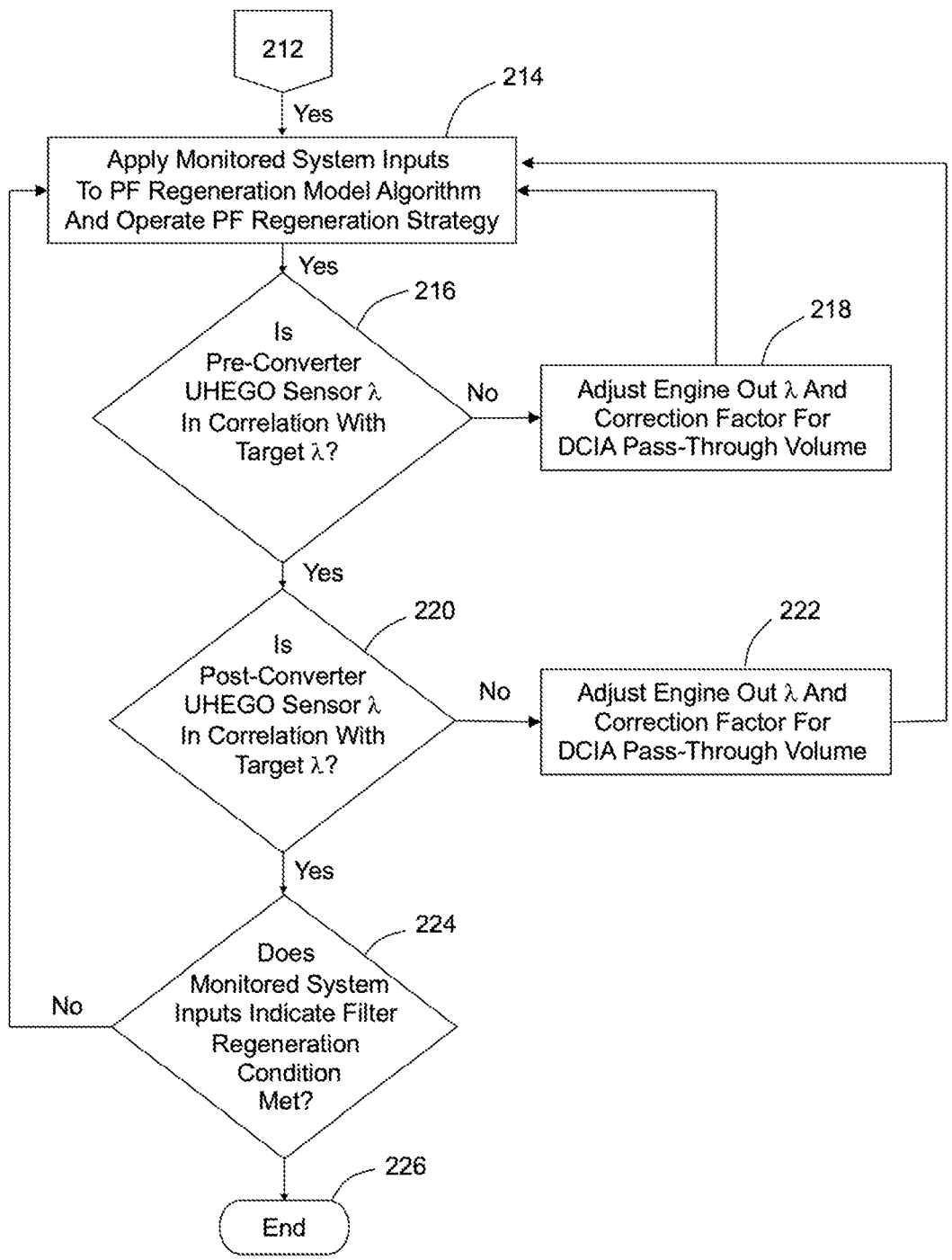
FIG. 2B is a continuation of the flow chart in FIG. 2A.

Referring now to FIGS. 1 and 2A-2B, a flowchart for a method 20 of regeneration of the PF 138 is shown. The method 20 includes initiating or starting continuous monitoring of the PF 138 at 200 (FIG. 2A). Non-limiting examples of monitoring the PF 138 include using at least one PF sensor such as the particulate sensors 144a, 144b to provide estimated particulate mass accumulation values to the engine controller 105, the pressure sensors 146a, 146b to provide pressure values to the engine controller 105, and/or the temperature sensors 148a, 148b to provide temperature values to the engine controller 105.

The method 20 proceeds to 202 where an amount of particulate mass accumulated in the PF 138 is determined or estimated. In some variations the amount of particulate mass accumulated in the PF 138 is determined using a lookup table. In the alternative, or in addition to, the amount of particulate mass accumulated in the PF 138 is determined using as a model (algorithm). For example, in at least one variation the system 10 uses RF particulate sensors 144a, 144b that transmit and receive RF signals through the PF 138. In such a variation the engine controller 105 uses a change in response RF signal to select an accumulated particulate mass value from a lookup table and/or as an input in a model that calculates an accumulated particulate mass value.

In some variations, the system 10 uses the pre-converter pressure sensor 146a to measure and transmit an upstream (relative to the PF 138) pressure signal to the engine controller 105 and the post-converter pressure sensor 146b to measure and transmit a downstream (relative to the PF 138) pressure signal to the engine controller 105. In such variations the engine controller 105 calculates a change in pressure ($\Delta P$) between the pressure sensors 146a, 146b and uses the $\Delta P$ to select an accumulated particulate mass value from a lookup table and/or as an input in a model that calculates an accumulated particulate mass value.

In at least one variation the system 10 uses the pre-converter temperature sensor 148a to measure and transmit an upstream temperature signal to the engine controller 105 and the post-converter temperature sensor 148b to measure and transmit a downstream temperature signal to the engine controller 105. In such a variation the engine controller 105 calculates a change in temperature ($\Delta T$) between the temperature sensors 148a, 148b and uses the $\Delta T$ to select a rate of soot oxidation during PF regeneration from a lookup table and/or as an input in a model that calculates an accumulated particulate mass value and/or to monitor the rate of soot oxidation during PF regeneration. It should be understood that the engine controller 105 can use a combination of signals from the particulate sensors 144a, 144b, pressure sensors 146a, 146b and/or temperature sensors 148a, 148b to select an accumulated particulate mass value from a lookup table and/or as an input in a model that calculates an accumulated particulate mass value.

After the amount of accumulated particulate mass in the PF 138 is determined or estimated at 202, the method 20 proceeds to determine if the PF 138 has reached a PF regeneration threshold at 204. For example, the engine controller 105 can include memory 106 with a stored PF regeneration threshold value that is compared to a determined or estimated accumulated particulate mass value (referred to herein simply as "accumulated particulate mass value") discussed above. If the accumulated particulate mass value of the PF 138 has not reached the PF regeneration threshold value at 204, then the method 20 proceeds back to 202 where the accumulated particulate mass in the PF 138 is continuously updated. In the alternative, if the accumulated particulate mass value in the PF 138 has reached the PF regeneration threshold value at 204, the method 20 proceeds to determine if a current torque requirement of the ICE 100 allows for cylinder deactivation while maintaining a desired engine out $\lambda$ needed for exhaust emissions control at 206. That is, the method 20 determines if the current torque requirement of the ICE 100 is above or below a predetermined torque threshold.

If the current torque requirement does not allow for cylinder deactivation while maintaining a desired engine out target $\lambda$ (i.e., the current torque requirement is above a predetermined torque threshold), then the method 20 proceeds to determine whether or not the accumulated particulate mass value of the PF 138 has reached a mandatory PF regeneration threshold at 208. If the accumulated particulate mass value of the PF 138 has reached a mandatory PF regeneration threshold, then the method 20 proceeds to an alternative PF regeneration strategy that initiates PF regeneration at 210, e.g., conventional PF regeneration strategies such as commanding all active cylinders 120 to run lean and generate exhaust gas with $\lambda > 1.0$. In the alternative, if the accumulated particulate mass value of the PF 138 has not reached a mandatory PF regeneration threshold, then the method 20 proceeds back to 206. This cycle of 206-208-206 continues until the accumulated particulate mass value of the PF 138 reaches a mandatory PF regeneration threshold at 208 or the current torque requirement of the ICE 100 allows for cylinder deactivation while maintaining a desired engine out $\lambda$ at 206.

When the method 20 determines the current torque requirement of the ICE 100 allows for cylinder deactivation while maintaining a desired engine out $\lambda$ at 206 (i.e., the current torque requirement is below a predetermined torque threshold), the method 20 proceeds to apply the monitored system inputs or signals from the PF sensors described above (e.g., particulate sensors 144a, 144b, pressure sensors 146a, 146b, and/or temperature sensors 148a, 148b) to a PF regeneration model algorithm that commands a PF regeneration strategy at 214 (FIG. 2B). Any PF regeneration strategy can be used to command the regeneration of the PF 138. One non-limiting PF regeneration strategy oxidizes or estimates the oxidization of accumulated particulate mass in the PF 138 using the following expression:

$$-\frac{dm}{dt} = K \cdot m_s \cdot P_{O2} = A \cdot \exp\left(-\frac{E_a}{RT}\right) \cdot m_s \cdot P_{O2} \qquad \text{Eqn. 1}$$

where $$-\frac{dm}{dt}$$

is the rate of particulate mass oxidation, K is reaction rate constant for the oxidation of particulate mass, $m_s$ is the accumulated particulate mass, $P_{O2}$ is the oxygen partial pressure in the exhaust gas entering and flowing through the PF 138, A is the frequency factor, $E_a$ is the activation energy for particulate mass oxidation, R is the ideal gas constant, and T is the temperature of the reaction.

At 216 the PF regeneration strategy determines if the exhaust gas exiting the ICE 100 and flowing into the exhaust system 130 has a $\lambda$ that agrees with or is in correlation with a target $\lambda$ determined by the PF regeneration model algorithm for PF regeneration. It should be understood that the λ for the exhaust gas exiting the ICE 100 and flowing into the exhaust system 130 is measured by the pre-converter UHEGO sensor 142a and is referred to herein as the "pre-converter UHEGO sensor λ." If the pre-converter UHEGO sensor λ is not in correlation with the target λ, then the method 20 proceeds to 218 where the engine controller 105 determines an adjusted engine out λ and a correction factor for an adjusted DCIA pass-through volume that will provide the adjusted engine out λ, and deactivates at least one cylinder 120 such that the adjusted DCIA pass-through volume is provided by the ICE 100. The method then proceeds back to 214.

If the pre-converter UHEGO sensor λ is in correlation with the target λ, then the method 20 proceeds to 220 where the engine controller 105 determines if the exhaust gas exiting the TWC converter 136 has a λ that is in correlation with the target λ. It should be understood that the λ for the exhaust gas exiting the TWC converter 136 is measured by the post-converter UHEGO sensor 142b and is referred to herein as the "post-converter UHEGO sensor λ." If the post-converter UHEGO sensor λ is not in correlation with the target λ, then the method 20 proceeds to 224 where the engine controller 105 determines an adjusted engine out λ and a correction factor for an adjusted DCIA pass-through volume that will provide the adjusted engine out λ, and deactivates at least one cylinder 120 such that the adjusted DCIA pass-through volume is provided by the ICE 100. The method then proceeds back to 214. If the post-converter UHEGO sensor λ is in correlation with the target λ, the method 20 proceeds to 224 where the engine controller 105 determines if the monitored system inputs indicate PF regeneration has been completed. If the monitored system inputs do not indicate PF regeneration has been completed at 224, then the method 20 returns to 214. In the alternative, if the monitored system inputs does indicate PF regeneration has been completed at 224, then the method 20 ends the regeneration strategy at 226.

It should be understood that the exhaust gas containing the DCIA pass-through volume is enriched in oxygen and has an oxygen content such that the determined or estimated amount of accumulated particulate mass in the PF 138 is oxidized and the PF 138 is regenerated. Also, the engine controller 105 determines and commands a required DCIA pass-through volume for oxidizing the accumulated particulate mass in the PF 138 as function of the estimated amount of accumulated particulate mass in the PF 138 and the difference between the target λ determined by the PF regeneration model algorithm and the measured λ value provided by the post-converter UHEGO sensor 142b. And the measured the post-converter UHEGO sensor λ provides enhanced control of PF regeneration thereby reducing the chances of damaging the PF during regeneration and/or emissions slip from the ICE 100.

Based on the foregoing, the following provides a general overview of the present disclosure and is not a comprehensive summary.

In one form of the present disclosure, a system for particulate filter regeneration includes a pre-converter UHEGO sensor disposed upstream from a TWC converter and a PF and a post-converter UHEGO sensor disposed downstream from the TWC converter and upstream from the PF. The system also includes an engine controller for an ICE and the engine controller is in communication with the pre-converter UHEGO sensor and the post-converter UHEGO sensor. The engine controller is configured to determine an amount of accumulated particulate mass in the PF during operation of the ICE and deactivate at least one of a plurality of cylinders of the ICE such that a DCIA pass-through volume flows through the at least one deactivated cylinder and into the TWC converter and the PF. Also, the DCIA pass-through volume can be a function of the determined amount of accumulated particulate mass in the PF.

In some variations of the present disclosure, the system includes at least one PF sensor and the engine controller is configured to determine the amount of accumulated particulate mass in the PF as a function of a pressure value measured by the at least one PF sensor. In at least one variation, the system includes a pair of PF sensors and the engine controller is configured to determine the amount of accumulated particulate mass in the PF as a function of a radio frequency feedback signal measured by one of the pair of PF sensors.

In at least one variation, the engine controller includes an regeneration method (RM) algorithm configured to determine a target lambda for exhaust gas entering the PF such that the determined amount of accumulated particulate mass in the PF is oxidized by the exhaust gas at a target oxidation rate. In some variations the engine controller is configured to compare the target lambda to a pre-converter UHEGO sensor lambda and determine an adjusted engine out lambda as a function of a difference between the target lambda and the pre-converter UHEGO sensor lambda. In such variations, the engine controller can be configured to determine a correction factor for the DCIA pass-through volume as a function of the difference between the target lambda and the pre-converter UHEGO sensor lambda. In other variations, the engine controller is configured to compare the target lambda to a post-converter UHEGO sensor lambda and determine an adjusted engine out lambda as a function of a difference between the target lambda and the post-converter UHEGO sensor lambda. In such variations, the engine controller can be configured to determine a correction factor for the DCIA pass-through volume as a function of the difference between target lambda and the post-converter UHEGO sensor lambda.

In some variations the engine controller is configured to compare the target lambda to a post-converter UHEGO sensor lambda after comparing the target lambda to a pre-converter UHEGO sensor lambda. In such variations, the engine controller can be configured to determine an adjusted engine out lambda as a function of a difference between the target lambda and the post-converter UHEGO sensor lambda and determine a correction factor for the DCIA pass-through volume as a function of a difference between the target lambda and the post-converter UHEGO sensor lambda.

In at least one variation, the engine controller is configured to determine a current torque demand for the ICE before deactivating at least one of a plurality of cylinders of the ICE. In such a variation, the engine controller can be configured to deactivate the at least one of the plurality of cylinders of the ICE when the current torque demand is below a predetermined torque threshold and not to deactivate the at least one of the plurality of cylinders of the ICE when the current torque demand is above the predetermined torque threshold. In at least one variation, the engine controller is configured to command a mandatory PF regeneration strategy when the current torque demand is above the predetermined torque threshold and the determined amount of accumulated particulate mass in the PF is greater than a mandatory PF regeneration threshold.

In another form of the present disclosure, a vehicle with a system for particulate filter regeneration, the vehicle includes an ICE with a plurality of cylinders and an exhaust aftertreatment system having a TWC converter and a PF downstream from the TWC converter. At least one PF sensor such as of a pressure sensor, a particulate sensor and a temperature sensor, among others is included, as are a pre-converter UHEGO sensor disposed upstream from the TWC converter and a post-converter UHEGO sensor disposed downstream from the TWC converter and upstream from the PF. The system also includes an engine controller in communication with the at least one PF sensor, the pre-converter UHEGO sensor and the post-converter UHEGO sensor. The engine controller is configured to determine an amount of accumulated particulate mass in the PF during operation of the ICE as a function of at least one signal provided by the at least one PF sensor and to deactivate at least one of the plurality of cylinders of the ICE such that a DCIA pass-through volume flows through the at least one deactivated cylinder and the exhaust aftertreatment system, wherein the DCIA pass-through volume is a function of the determined amount of accumulated particulate mass in the PF.

In some variations the engine controller is configured to compare a target lambda to a pre-converter UHEGO sensor lambda, command an adjusted engine out lambda as a function of a difference between the target lambda and the pre-converter UHEGO sensor lambda, and command the DCIA pass-through volume as a function of the adjusted engine out lambda. In at least one variation, the engine controller is configured to compare the target lambda to a post-converter UHEGO sensor lambda, command an adjusted engine out lambda as a function of a difference between the target lambda and the post-converter UHEGO sensor lambda, and command the DCIA pass-through volume as a function of the adjusted engine out lambda.

In some variations, the engine controller is configured to compare the target lambda to a post-converter UHEGO sensor lambda after comparing the target lambda to a pre-converter UHEGO sensor lambda, command an adjusted engine out lambda as a function of a difference between the target lambda and the post-converter UHEGO sensor lambda, and command an adjusted DCIA pass-through volume as a function of a difference between the target lambda and the post-converter UHEGO sensor lambda.

In still another form of the present disclosure, a method for regeneration of a PF includes deactivating at least one cylinder of an ICE such that a DCIA pass-through volume flows through the at least one deactivated cylinder and mixes with combusted exhaust gas to form oxygen enriched exhaust gas that flows into an exhaust gas aftertreatment system with the PF such that accumulated particulate mass in the PF is oxidized. The method also includes monitoring oxygen content in the oxygen enriched exhaust gas flowing into the exhaust gas aftertreatment system with a pre-converter UHEGO sensor disposed upstream from a TWC converter and monitoring oxygen content in the oxygen enriched exhaust gas flowing into the PF with a post-convert UHEGO sensor disposed downstream the TWC converter and upstream the PF.

In some variations, the method includes comparing a target lambda for the exhaust gas to a post-converter UHEGO sensor lambda, determining an adjusted engine out lambda as a function of a difference between the target lambda and the post-converter UHEGO sensor lambda, and determining a correction factor for the DCIA pass-through volume as a function of a difference between the target lambda and the post-converter UHEGO sensor lambda.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

In this application, the term "controller" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

What is claimed is:

1. A system for particulate filter regeneration comprising:
a pre-converter universal heated exhaust gas oxygen (UHEGO) sensor disposed upstream from a three-way catalytic (TWC) converter and a particulate filter (PF) and a post-converter UHEGO sensor disposed downstream from the TWC converter and upstream from the PF; and
an engine controller for an internal combustion engine (ICE), the engine controller in communication with the pre-converter UHEGO sensor and the post-converter UHEGO sensor, wherein;
the engine controller is configured to:

determine an amount of accumulated particulate mass in the PF during operation of the ICE; and deactivate at least one of a plurality of cylinders of the ICE such that a deactivated cylinder intake air (DCIA) pass-through volume flows through the at least one deactivated cylinder and into the TWC converter and the PF, wherein the DCIA pass-through volume is a function of the determined amount of accumulated particulate mass in the PF; and wherein the engine controller includes a regeneration model (RM) algorithm configured to determine a target lambda for exhaust gas entering the PF such that the determined amount of accumulated particulate mass in the PF is oxidized by the exhaust gas at a target oxidation rate.

2. The system according to claim 1 further comprising at least one PF sensor, wherein the engine controller is configured to determine the amount of accumulated particulate mass in the PF as a function of a pressure value measured by the at least one PF sensor.

3. The system according to claim 1 further comprising a pair of PF sensors, wherein the engine controller is configured to determine the amount of accumulated particulate mass in the PF as a function of a radio frequency feedback signal measured by one of the pair of PF sensors.

4. The system according to claim 1, wherein the engine controller is configured to compare the target lambda to a pre-converter UHEGO sensor lambda and determine an adjusted engine out lambda as a function of a difference between the target lambda and the pre-converter UHEGO sensor lambda.

5. The system according to claim 4, wherein the engine controller is configured to determine a correction factor for the DCIA pass-through volume as a function of the difference between the target lambda and the pre-converter UHEGO sensor lambda.

6. The system according to claim 1, wherein the engine controller is configured to compare the target lambda to a post-converter UHEGO sensor lambda and determine an adjusted engine out lambda as a function of a difference between the target lambda and the post-converter UHEGO sensor lambda.

7. The system according to claim 6, wherein the engine controller is configured to determine a correction factor for the DCIA pass-through volume as a function of the difference between the target lambda and the post-converter UHEGO sensor lambda.

8. The system according to claim 1, wherein the engine controller is configured to compare the target lambda to a post-converter UHEGO sensor lambda after comparing the target lambda to a pre-converter UHEGO sensor lambda.

9. The system according to claim 8, wherein the engine controller is configured to determine an adjusted engine out lambda as a function of a difference between the target lambda and the post-converter UHEGO sensor lambda.

10. The system according to claim 9, wherein the engine controller is configured to determine a correction factor for the DCIA pass-through volume as a function of a difference between the target lambda and the post-converter UHEGO sensor lambda.

11. The system according to claim 1, wherein the engine controller is configured to determine a current torque demand for the ICE before deactivating the at least one of the plurality of cylinders of the ICE.

12. The system according to claim 11, wherein the engine controller is configured to deactivate the at least one of the plurality of cylinders of the ICE when the current torque demand is below a predetermined torque threshold and not to deactivate the at least one of the plurality of cylinders of the ICE when the current torque demand is above the predetermined torque threshold.

13. The system according to claim 12, wherein the engine controller is configured to command a mandatory PF regeneration strategy when the current torque demand is above the predetermined torque threshold and the determined amount of accumulated particulate mass in the PF is greater than a mandatory PF regeneration threshold.

14. A vehicle with a system for particulate filter regeneration, the vehicle comprising:

an internal combustion engine (ICE) comprising a plurality of cylinders and an exhaust aftertreatment system having a three-way catalytic (TWC) converter and a particulate filter (PF) downstream from the TWC converter;

at least one PF sensor selected from the group consisting of a pressure sensor, a particulate sensor and a temperature sensor;

a pre-converter universal heated exhaust gas oxygen (UHEGO) sensor disposed upstream from the TWC converter and a post-converter UHEGO sensor disposed downstream from the TWC converter and upstream from the PF; and an engine controller in communication with the at least one PF sensor, the pre-converter UHEGO sensor and the post-converter UHEGO sensor, wherein the engine controller is configured to:

determine an amount of accumulated particulate mass in the PF during operation of the ICE as a function of at least one signal provided by the at least one PF sensor; and deactivate at least one of the plurality of cylinders of the ICE such that a deactivated cylinder intake air (DCIA) pass-through volume flows through the at least one deactivated cylinder and the exhaust aftertreatment system, wherein the DCIA pass-through volume is a function of the determined amount of accumulated particulate mass in the PF, wherein the engine controller is further configured to perform at least one of (A), (B), and (C):

(A) compare a target lambda to a pre-converter UHEGO sensor lambda, command an adjusted engine out lambda as a function of a difference between the target lambda and the pre-converter UHEGO sensor lambda, and command the DCIA pass-through volume as a function of the adjusted engine out lambda, (B) compare the target lambda to a post-converter UHEGO sensor lambda, command an adjusted engine out lambda as a function of a difference between the target lambda and the post-converter UHEGO sensor lambda, and command the DCIA pass-through volume as a function of the adjusted engine out lambda, and (C) compare the target lambda to the post-converter UHEGO sensor lambda after comparing the target lambda to the pre-converter UHEGO sensor lambda, command an adjusted engine out lambda as a function of a difference between the target lambda and the post-converter UHEGO sensor lambda, and command an adjusted DCIA pass-through volume as a function of a difference between the target lambda and the post-converter UHEGO sensor lambda.

15. A method for regeneration of a particulate filter (PF), the method comprising:

deactivating at least one cylinder of an internal combustion engine (ICE) such that a deactivated cylinder intake air (DCIA) pass-through volume flows through the at least one deactivated cylinder and mixes with combusted exhaust gas to form oxygen enriched exhaust gas that flows into an exhaust gas aftertreatment system with the PF such that accumulated particulate mass in the PF is oxidized;

monitoring oxygen content in the oxygen enriched exhaust gas flowing into the exhaust gas aftertreatment system with a pre-converter universal heated exhaust gas oxygen (UHEGO) sensor disposed upstream from a three-way catalytic (TWC) converter;

monitoring oxygen content in the oxygen enriched exhaust gas flowing into the PF with a post-converter UHEGO sensor disposed downstream from the TWC converter and upstream from the PF; and performing at least one of (A) and (B):

(A) comparing a target lambda for the exhaust gas to a post-converter UHEGO sensor lambda; determining an adjusted engine out lambda as a function of a difference between the target lambda and the post-converter UHEGO sensor lambda; and determining a correction factor for the DCIA pass-through volume as a function of a difference between the target lambda and the post-converter UHEGO sensor lambda; or (B) comparing the target lambda to a pre-converter UHEGO sensor lambda; determining an adjusted engine out lambda as a function of a difference between the target lambda and the pre-converter UHEGO sensor lambda, and determining the correction factor of the DCIA pass-through volume as a function of the adjusted engine out lambda.

16. The method according to claim 15, wherein when performing (A), the method further comprises comparing the target lambda to the pre-converter UHEGO sensor lambda, wherein the target lambda is compared to the post-converter UHEGO sensor lambda after comparing the target lambda to the pre-converter UHEGO sensor lambda.

* * * * *